United States Patent [19]

Hancock

[11] Patent Number: 6,020,285

[45] Date of Patent: Feb. 1, 2000

[54] CALCIUM ALUMINATE CEMENT BASED CATALYST

[75] Inventor: Frederick Ernest Hancock, Cleveland, United Kingdom

[73] Assignee: Imperial Chemical Industries PLC, Millbank London, United Kingdom

[21] Appl. No.: 08/983,581

[22] PCT Filed: Jul. 16, 1996

[86] PCT No.: PCT/GB96/01698

§ 371 Date: Jan. 22, 1998

§ 102(e) Date: Jan. 22, 1998

[87] PCT Pub. No.: WO97/04870

PCT Pub. Date: Feb. 13, 1997

[30] Foreign Application Priority Data

Jul. 27, 1995 [GB] United Kingdom ................. 9515300

[51] Int. Cl.[7] ............................. B01J 21/08; B01J 23/00; B01J 23/70; C07C 5/10

[52] U.S. Cl. .................... 502/314; 502/250; 502/315; 502/316; 502/336; 502/338; 585/270; 585/267; 585/328

[58] Field of Search .................... 502/300, 250, 502/313, 314, 315, 316, 336, 338, 328; 585/267, 270, 277, 269

[56] References Cited

U.S. PATENT DOCUMENTS

| 4,205,961 | 6/1980 | Moller et al. | 48/197 R |
|---|---|---|---|
| 4,329,530 | 5/1982 | Irvin et al. | 585/259 |
| 4,410,455 | 10/1983 | Lambert | 502/327 |
| 4,572,862 | 2/1986 | Ellis | 428/245 |
| 4,732,688 | 3/1988 | Bryan et al. | 210/753 |
| 4,888,157 | 12/1989 | Carnell et al. | 423/230 |
| 4,992,408 | 2/1991 | Jackson | 502/328 |
| 5,041,408 | 8/1991 | King et al. | 502/328 |
| 5,149,893 | 9/1992 | King et al. | 585/267 |
| 5,220,110 | 6/1993 | King et al. | 588/238 |

*Primary Examiner*—Steven P. Griffin
*Assistant Examiner*—Cam N. Nguyen

[57] ABSTRACT

Shaped particles suitable for use as a catalyst, or precursor thereto, particularly for the decomposition of hypohalite ions in aqueous solution, comprising a high alumina cement having an aluminium to calcium atomic ratio above 2.5 and at least one oxide of a Group VIII metal M selected from nickel and cobalt, said particles containing 10 to 70% by weight of said Group VIII metal oxide and having a porosity in the range of 30 to 60%, in which at least 10% of the pore volume is in the form of pores of size in the range 15 to 35 nm and less than 65% of the pore volume is in the form of pores of diameter greater then 35 nm are disclosed.

9 Claims, No Drawings

CALCIUM ALUMINATE CEMENT BASED CATALYST

This application is the National Stage of International No. PCT/GB96/01698 filed Jul. 16, 1996.

This invention relates to catalysts and in particular to catalysts, or precursors thereto, containing an inert support material and at least one oxide of a metal of Group VIII of the Periodic Table and selected from nickel and cobalt.

In our EP 0 397 342 we describe catalysts in the form of shaped particles, e.g. extrudates, containing a calcium aluminate cement, an oxide of cobalt and/or nickel, and optionally a finely divided diluent material, the shaped particles having specified porosity and specified pore size distribution characteristics. These catalysts were of particular utility for the decomposition of hypochlorite ions in an aqueous medium.

In that specification we indicated that increasing the porosity of the particles was desirable as it allows the reactants to have ready access to the active material within the particles. However this had the disadvantage that the strength of the particles was decreased.

We have now found that by employing a calcium aluminate cement having a high alumina content, the porosity can be increased without undue loss of strength and as a result the activity of the catalyst can be increased. Surprisingly, despite the higher porosity, the bulk density of the particles can be increased so that a greater mass of particles, and hence active material, can be accommodated in a catalyst bed of given volume. [The bulk density is determined by filling a vessel of known volume with the catalyst particles, with tapping of the vessel to ensure that the particles settle, and then determining the weight of particles in the vessel.]

Calcium aluminate cements are hydraulic cements containing one or more calcium aluminate compounds of the formula $nCaO.mAl_2O_3$ where n and m are integers. Calcium aluminate compounds mentioned in the aforesaid specification include calcium mono-aluminate $CaO.Al_2O_3$, tri-calcium aluminate $3CaO.Al_2O_3$, penta-calcium tri-aluminate $5CaO.3Al_2O_3$, tri-calcium penta-aluminate $3CaO.5Al_2O_3$, and dodeca-calcium hepta-aluminate $12CaO.7Al_2O_3$. The calcium aluminate cement used in the examples of that specification had an aluminium to calcium atomic ratio of about 1.4. By the term high alumina cement, we mean a calcium aluminate cement having an aluminium to calcium atomic ratio above 2.5. Such cements are known and may contain one or more of the above calcium aluminate compounds, and or compounds such as calcium di-aluminate $CaO.2Al_2O_3$, in some cases with additional alumina.

Accordingly the present invention provides shaped particles suitable for use as a catalyst, or precursor thereto, comprising a calcium aluminate cement having an aluminium to calcium atomic ratio above 2.5, and preferably above 4.0, and at least one oxide of a Group VIII metal M selected from nickel and cobalt, said particles containing 10 to 70% by weight of said Group VIII metal oxide (expressed as the divalent oxide, MO) and having a porosity in the range 30 to 60%, particularly 40 to 55%, in which at least 10% of the pore volume is in the form of pores of size in the range 15 to 35 nm and less than 65% of the pore volume is in the form of pores of diameter greater than 35 nm.

As described in the aforesaid EP 0 397 342, for some catalytic applications the Group VIII metal oxide is the catalytically active species while for other catalytic applications the Group VIII metal oxide is a catalyst precursor and the catalytically active species is the product of reducing the Group VIII metal oxide to the Group VIII metal or is the product of oxidising the Group VIII metal oxide in the precursor to a higher oxidation state. For example catalysts obtained by reduction of a precursor containing nickel and/or cobalt oxide are of use as hydrogenation catalysts, e.g. methanation catalysts for the hydrogenation of carbon oxides to methane or catalysts for the hydrogenation of aromatic compounds such as benzene to cyclohexane. Another use of supported nickel and/or cobalt oxides is as catalysts for the decomposition of oxidising agents such as hypochlorite ions in aqueous solutions, for example in the treatment of effluents containing such ions prior to discharge of into rivers, lakes, or estuaries.

The shaped particles are preferably in the form of granules, extrudates, or pellets and preferably have an aspect ratio, by which we mean the ratio of the weight average maximum geometric dimension, e.g. length, to weight average minimum geometric dimension, e.g. diameter, of less than 3, particularly less than 2. Particles having a greater aspect ratio may be liable to suffer from breakage during use. The shaped particles preferably have a weight average maximum dimension in the range 2 to 8 mm, particularly 3 to 8 mm. This ensures that the particles have a relatively high a geometric surface area per unit bed volume, so that a bed of the particles has a relatively large external particle area exposed to the reactants without the presence of an undue proportion of fines which would lead to unacceptable pressure drop on passage of reactants through a bed of the particles.

The particles of the invention have a porosity in the range 30 to 60%, particularly 40–55%. By the term porosity we mean the ratio of the volume of the pores to the volume of the particle. Porosity may be determined by measurement of the mercury and helium densities of the particles: the porosity (as a percentage) is given by $$\text{porosity} = P_{Hg} \times [1/p_{Hg} - 1/p_{He}] \times 100$$

where $P_{Hg}$ and $P_{He}$ are respectively the densities of the particles measured by displacement of mercury and helium. The mercury density is thus a measure of the particle density, while the helium density is a measure of the skeletal density.

The particles of the invention have a particular pore size distribution. This may be determined by mercury intrusion porosimetry. In the particles of the invention, at least 10%, and preferably 10 to 40%, of the pore volume is in the form of pores of average diameter in the range 15–35 nm and less than 65% of the pore volume is in the form of pores of average diameter above 35 nm. Particles having such a pore size are of particular utility where they are used for the decomposition of oxidising agents in aqueous media.

Largely as a result of the porosity and pore size distribution, the particles also have a relatively high BET surface area, above 10, and in particular in the range 20–100, $m^2.g^{-1}$. As a result the active material is present in a finely divided state. Such a BET surface area may be achieved by introducing the Group VIII metal oxide into the composition by a precipitation route as described hereinafter.

As a result of their composition and porosity, the shaped particles of the invention have a bulk density in the range 0.8 to 1.5, preferably 0.9 to 1.4, $g.cm^{-3}$. The bulk density is indicative of the weight of catalyst in a bed of given volume.

During use of the particles as a catalyst for the decomposition of oxidising agents, e.g. in effluents, the BET surface area, porosity and/or pore size distribution may change: thus the BET surface area, porosity, and the proportion of pores of size less than 35 nm may increase. The surface area, density, and porosity parameters of the shaped particles referred to herein refer to the parameters of the particles in the "as made" state, i.e. before use for catalytic purposes.

Shaped particles having the required porosity and pore volume characteristics may be made by a particular pelleting method as described hereinafter.

In addition to the high alumina cement, the composition comprises at least one oxide of a Group VIII metal selected from nickel and cobalt. Preferably the Group VIII metal is nickel alone, or nickel in admixture with cobalt in an amount of up to one mole of cobalt per mole of nickel.

Calcium aluminate cements are often contaminated with iron compounds, e.g. iron oxide. In the aforesaid EP 0 397 342 we indicated that the presence of iron oxide was beneficial where the shaped particles were to be used for hypochlorite decomposition as the iron exhibited some promoting effect on the catalytic activity. In contrast, in the present invention we have found that high activity catalysts can be produced with high alumina cements of low iron oxide content. In the present invention, the iron oxide content (expressed as $Fe_2O_3$) of the shaped particles is preferably less than 1% by weight. A particularly suitable high alumina cement having a low iron oxide content is that known as CA-25 which typically contains about 80% alumina, primarily as mono-calcium aluminate in admixture with dodeca-calcium hepta-aluminate, calcium di-aluminate, and free alumina.

The Group VIII metal oxide is preferably introduced into the composition by precipitation. A preferred route is to precipitate Group VIII metal compounds, decomposable to oxides by heating, from an aqueous solution of e.g. nitrates by addition of a precipitant such as an alkali metal carbonate solution. After precipitation of the Group VIII metal compounds, the precipitate is washed free of precipitant. The precipitate may be mixed with a finely divided, preferably inert, diluent material, such as magnesia and/or a clay, e.g. kaolin. The amount of such diluent material employed is conveniently up to twice the weight of the Group VIII metal compounds expressed as the divalent oxides. The mixture is then dried, and calcined, e.g. to a temperature in the range 200–600° C., particularly 400–550° C., to effect decomposition of the Group VIII metal compounds to the oxide form. Minor amounts of other ingredients, such as co-promoters such as magnesium oxide may be incorporated, e.g. by co-precipitation with the Group VIII metal compounds. The resultant composition is then mixed with the high alumina cement, optionally together with a processing aid such as a little water, a stearate of an alkaline earth metal, e.g. magnesium, and/or graphite, and formed into pellets. The proportion of cement employed is generally 25 to 100% by weight based on the total weight of the Group VIII metal oxide, or oxides, and any diluent material, and is such as to give a composition containing 10 to 70%, particularly less than 50%, and most preferably 20 to 40%, by weight of the Group VIII metal oxide or oxides.

In order to obtain shaped particles of the requisite pore volume characteristics, the mixture is conveniently pelletised by means of a pellet mill, for example of the type used for pelleting animal feedstuffs, wherein the mixture to be pelleted is charged to a rotating perforate cylinder through the perforations of which the mixture is forced by a bar or roller within the cylinder. The resulting extruded mixture is cut from the surface of the rotating cylinder by a doctor knife positioned to give pellets of the desired length. It will be appreciated that other extrusion techniques may be employed to give shaped particles of the desired characteristics.

After forming the composition into the desired shaped particles, the latter are then preferably contacted with water, preferably as steam, to effect hydration of the cement and to give the shaped particles adequate strength.

Shaped particles formed by this method have a significantly lower strength, e.g. as measured by a crushing test, than pellets prepared by a conventional tabletting technique but it is found that, even so, the strength is adequate for the applications envisaged and, indeed, the strength generally increases where the catalyst is employed for the decomposition of oxidising agents in aqueous media, presumably as a result of continued hydration of the cement.

For use for the decomposition of oxidising agents, the catalyst bed is contacted with a fluid medium, particularly aqueous, containing the oxidising agent to be treated. Examples of oxidising agents that may be decomposed using the shaped particles of the invention include hypohalite ions, for example hypochlorite and hypobromite ions, and hydrogen peroxide. At least some of such oxidising agents are pollutants in various industrial processes. In particular hypochlorite ions are a significant industrial pollutant. The catalysts may also find utility in the treatment of aqueous media containing organic pollutants: thus as hypochlorite may be added to an aqueous medium containing an oxidisable organic compound and the solution passed through a bed of the catalyst. The catalyst catalyses the decomposition of the hypochlorite which effects oxidation of the organic compound to more environmentally acceptable products such as carbon dioxide and water.

Conveniently a fixed bed of the catalyst particles is formed and the medium containing the oxidising agent, for example hypochlorite ions, is passed through the bed. Generally the medium is in the form of an aqueous solution which has been filtered prior to contact with the catalyst bed.

The treatment of aqueous media is conveniently effected under conditions such that the pH of the medium is above 7, preferably above 8; it is a particularly beneficial aspect of the invention that the particles do not physically disintegrate even at pH levels in the range 10 to 14. The process can be performed at any convenient temperature, suitably in the range 5–100° C., more suitably in the range 20–80° C.

When the shaped particles are contacted with the oxidising agent in an aqueous medium, some or all of the oxides of the particles may become hydrated. In addition the Group VIII metal oxides are oxidised to higher valency states. For example nickel oxide can be notionally considered to be initially present in the particles as NiO. Authorities vary as to precisely what higher oxides of nickel are formed but it may be regarded that the higher oxides $Ni_3O_4$, $Ni_2O_3$ and $NiO_2$ are formed on contact with the oxidising agent. Such higher oxides are active in the process of decomposition of the oxidising agent. In the particles of the present invention, the Group VIII metal oxides may be as initially formed or in their higher oxidation states, as formed in use. In use the oxides may also be present as hydrates. It should be noted, however, that the proportions specified herein of the Group VIII metal oxide in the particles are expressed on the basis of anhydrous oxides with the Group VIII oxides in the divalent state, i.e. NiO and/or CoO.

In addition to use for the decomposition of oxidising agents as described above, the shaped particles of the invention are also of use as precursors to hydrogenation catalysts, and may be converted to the catalytically active form by reduction, e.g. with a stream of a hydrogen-containing gas at an elevated temperature. Such reduction may be effected after charging the particles to a vessel in which the hydrogenation is to be effected. Alternatively, the reduction may be effected as a separate step prior to charging the particles to the hydrogenation reactor and, if desired, the reduced particles may be passivated by contact with a gas stream containing a small amount of oxygen, or with carbon dioxide followed by a gas stream containing a small amount of oxygen, until no further reaction occurs when the particles may then be handled in air at ambient temperature.

The invention is illustrated by the following example in which all parts and percentages are by weight.

A slurry containing precipitated basic nickel carbonate, and a mixture of finely divided magnesia and kaolin as diluent materials, was filtered, washed, dried, and then calcined at 400–450° C. The proportions of the ingredients were such that the calcined material contained about 14.1 parts of magnesia and about 113 parts of kaolin per 100 parts of nickel oxide.

100 parts of the calcined material were then mixed with about 2 parts of graphite and 41 parts of a high alumina cement, CA-25, having an aluminium to calcium atomic ratio of about 4.9 and having an iron content of about 0.2% to give a dry feed mixture.

The dry feed mixture was then mixed with water (25 parts per 100 parts of the cement-containing mixture), formed into extruded pellets of diameter of about 3 mm and lengths in the range of about 3 to 5 mm using a pellet mill as described hereinbefore, and then dried to give extrudates A.

For purposes of comparison the above procedure was repeated using a calcium aluminate cement having an aluminium to calcium atomic ratio of about 1.1 and an iron oxide content (expressed as $Fe_2O_3$) of about 14% in place of the high alumina cement. The resultant extrudates were termed extrudates B. The properties of the extrudates are shown in the following table.

|  |  | Extrudates | |
|---|---|---|---|
|  |  | A | B |
| Calculated composition (wt %) - after ignition at 900° C. | NiO | 31.3 | 31.1 |
|  | $Al_2O_3$ | 38.5 | 26.9 |
|  | CaO | 5.3 | 11.7 |
|  | MgO | 4.5 | 4.6 |
|  | $SiO_2$ | 20.0 | 21.2 |
|  | $Fe_2O_3$ | 0.4 | 4.5 |
| Porosity (%) |  | 47 | 35 |
| Pore volume | 15–35 nm | 16 | 35 |
|  | >35 nm | 54 | 38 |
| Bulk density (g/ml) |  | 1.20 | 1.05 |
| BET surface area ($m^2/g$) |  | 46 | 43 |

The activity of the catalysts for the decomposition of hypochlorite was assessed by charging 120 ml of the extrudates to a reactor of internal diameter 2.5 cm to form a catalyst bed therein. A feed of an aqueous solution containing 63.1 g/liter of sodium hypochlorite and having a pH of about 12.5 was preheated to about 30° C. was fed to the reactors at a space velocity of 0.8 $h^{-1}$ so that the hypochlorite solution flowed up through the catalyst bed. The exit sodium hypochlorite 10 concentration was found to be 0.56 g/l for extrudates A and 1.85 g/l for extrudates B indicating that the extrudates had a significantly greater activity. In addition, from the above table, it is seen that A had a significantly greater bulk density than that of extrudates B.

I claim:

1. Shaped particles suitable for use as a catalyst, or precursor thereto, comprising a calcium aluminate cement having an aluminium to calcium atomic ratio above 4.0 and at least one oxide of a Group VIII metal M selected from nickel and cobalt, said particles containing 10 to 70% by weight of said Group VIII metal oxide (expressed as the divalent oxide, MO) and having a porosity in the range 30 to 60% in which at least 10% of the pore volume is in the form of pores of size in the range 15 to 35 nm and less than 65% of the pore volume is in the form of pores of diameter greater than 35 nm.

2. Shaped particles according to claim 1 having a bulk density in the range 0.8 to 1.5 $g/cm^{-3}$.

3. Shaped particles according to claim 1 wherein 10 to 40% of the pore volume of the particles is in the form of pores of average diameter in the range 15 to 35 nm.

4. Shaped particles according to claim 1 containing less than 1% by weight of iron oxide (expressed as $Fe_2O_3$).

5. Shaped particles according to claim 1 comprising said calcium aluminate cement in admixture with i) a finely divided Group VIII metal M oxide obtained by calcination of a precipitated Group VIII metal M compound and ii) a finely divided diluent material in an amount of up to twice the weight of said Group VIII metal M oxide.

6. Shaped particles according to claim 5 containing 25 to 100% by weight of said calcium aluminate cement based on the total weight of said Group VIII metal M oxide and any diluent material.

7. Shaped particles according to claim 1 containing 20 to 40% by weight of said Group VIII metal M oxide.

8. A process for the decomposition of hypochlorite ions in an aqueous medium comprising contacting said medium with a fixed bed of shaped particles containing a calcium aluminate cement having an aluminum to calcium atomic ratio above 4.0 and at least one oxide of a Group VIII metal M selected from nickel and cobalt, said particles containing 10 to 70% by weight of said Group VIII metal oxide (expressed as the divalent oxide, MO) and having a porosity in the range 30 to 60% in which at least 10% of the pore volume is in the form of pores of size in the range 15 to 35 nm and less than 65% of the pore volume is in the form of pores of diameter greater than 35 mn.

9. A process according to claim 8 wherein the aqueous medium has a pH above 8.

* * * * *